United States Patent [19]

Mayes

[11] 4,174,270
[45] Nov. 13, 1979

[54] HIGH SEVERITY PROCESS FOR THE PRODUCTION OF AROMATIC HYDROCARBONS

[75] Inventor: Warden W. Mayes, Big Spring, Tex.

[73] Assignee: Cosden Technology, Inc., Big Spring, Tex.

[21] Appl. No.: 848,223

[22] Filed: Nov. 3, 1977

[51] Int. Cl.$^2$ ............................................ C10G 35/08
[52] U.S. Cl. ...................... 208/64; 208/65; 208/138; 208/139
[58] Field of Search ...................... 208/62, 63, 64, 139, 208/138, 66

[56] References Cited

U.S. PATENT DOCUMENTS

| | | | |
|---|---|---|---|
| 2,642,384 | 6/1953 | Cox | 208/139 |
| 2,848,377 | 8/1958 | Webb | 208/139 |
| 3,499,945 | 3/1970 | Kirk | 260/674 R |
| 3,635,815 | 1/1972 | Kuchar | 208/95 |
| 3,647,679 | 3/1972 | Kirk et al. | 208/64 |
| 4,000,058 | 12/1976 | Duhaut | 208/139 |

Primary Examiner—C. Davis
Attorney, Agent, or Firm—Schwartz, Jeffery, Schwaab, Mack, Blumenthal & Koch

[57] ABSTRACT

Disclosed is a process for the production of highly aromatic reformates, having a minimum of nonaromatic material, in high yield from a naphtha feed fraction by high-severity catalytic reforming, using a halogen-promoted reforming catalyst. The process comprises reforming the naphtha feed under reforming conditions of high severity in a plurality of sequentially arranged reaction zones in which the concentration of the halogen component of the reforming catalyst is adjusted to provide a minimal hydrocracking activity relative to the other reforming reactions to the catalyst in the first reaction zones, and an enhanced hydrocracking activity to the catalyst in the last reaction zones. The reformates produced according to this process are particularly useful in the blending of high aromatic content gasolines and/or in the production of high purity aromatic hydrocarbons.

27 Claims, 1 Drawing Figure

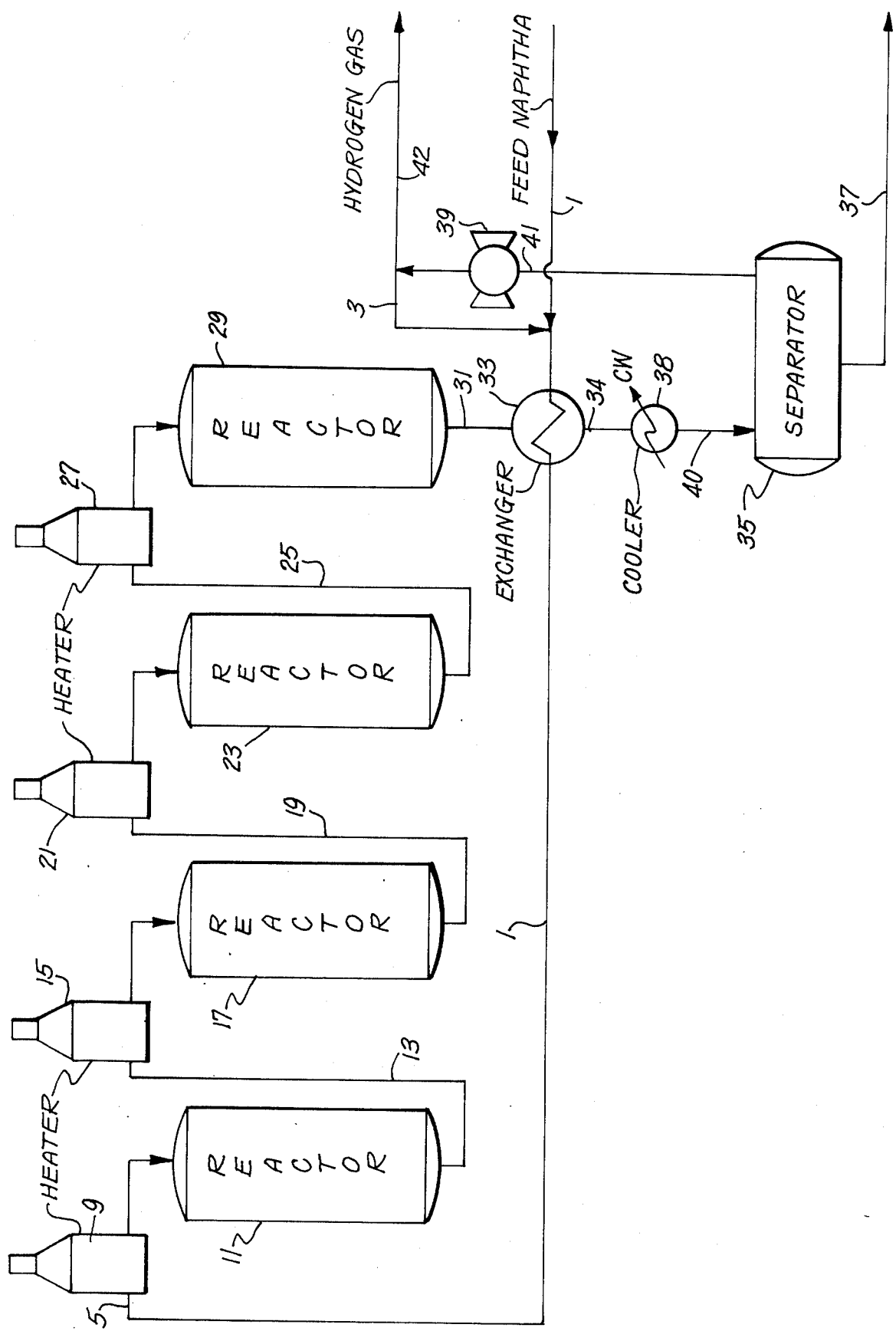

HIGH SEVERITY PROCESS FOR THE PRODUCTION OF AROMATIC HYDROCARBONS

BACKGROUND OF THE INVENTION

The present invention relates to a process for the preparation of highly aromatic reformates which are suitable for use in blending high aromatic content motor gasolines and/or for the production of high purity aromatic petrochemical products by high-severity reforming. More particularly, the present invention relates to a process for the conversion of naphtha stocks by high-severity catalytic reforming, under conditions in which the balance between the various reforming reactions is controlled by catalyst modification, to produce a reformate of heretofore unobtainable aromatic content and yields, and which is of sufficient quality to produce commercially acceptable purity aromatic hydrocarbons directly upon separation by fractional distillation.

The process of the present invention is particularly efficacious for the production of $C_6$ to $C_8$ aromatic hydrocarbons with outstanding purity and yield. As will be understood by those skilled in the art, the term "$C_6$ to $C_8$ aromatic hydrocarbons" as used herein refers to aromatic hydrocarbons having 6 to 8 carbon atoms per molecule, and includes such aromatic hydrocarbons as benzene, toluene, and xylene. As also used herein, the term "xylenes" refers to the $C_8$ aromatic hydrocarbons in a generic sense and includes para-xylenes, metal-xylenes, orthoxylenes and ethylbenzene. Moreover, as further used herein, the term "highly aromatic reformates" refers to those reformates which are of sufficient quality to yield $C_7$ and/or $C_8$ aromatic hydrocarbons of commercially acceptable quality directly upon fractional distillation without the necessity for solvent extraction or extractive distillation. Generally, such reformates will have a research clear octane value of at least about 100. Accordingly, the present invention contemplates the production of reformates of at least about 100 research clear octane. Reformates of this octane value are highly useful in the production of high purity aromatic hydrocarbons, and are also highly advantageous for use as blending stocks in the preparation of high octane, lead-free motor gasolines having a high aromatic content.

In the production of aromatic hydrocarbons, it is well known that naphthas contain large amounts of naphthenes which can be catalytically reformed to aromatic hydrocarbons, and particularly $C_6$ to $C_8$ aromatic hydrocarbons under conditions effective for dehydrogenation, isomerization, and dehydrocyclicization. Heretofore, however, the presence of nonaromatic, and particularly paraffinic materials, in the feed stock which boil in the same range as the desired aromatics has posed signifcant obstacles to the production of high-purity aromatic hydrocarbons in high yields. In conventional reforming processes, significant quantities of thse nonaromatic materials are not substantially converted to aromatics and/or cracked to lower-boiling, easily removable compounds. Consequently, reformates produced under conventional reforming conditions contain significant amounts of paraffins which cannot be separated from the aromatic hydrocarbons by low-cost separation techniques, such as fractional distillation, but only with great cost and difficulty such as by solvent extraction or extractive distillation. Accordingly, in order to produce a $C_6$ to $C_8$ aromatic hydrocarbon product of commercial quality, it is conventional to subject the resultant reformate to a costly solvent extraction step. Due to the large cost attendant solvent extraction, and the additional manpower required therefor, the prior art has sought to develop processes for the production of reformates which do not require a solvent extraction step in order to produce an aromatic hydrocarbon product of commercially acceptable quality.

Generally, these prior art processes have involved reforming the naphtha stocks under reforming conditions of high severity in order to crack the paraffins to easily removable gaseous hydrocarbons. In conventional high-severity reforming processes, however, the high severities necessary to produce a reformate having a concentration of paraffins sufficiently low to yield high-purity aromatic hydrocarbons without solvent extraction has also resulted in the cracking of significant quantities of naphthenes, with a concomitant decrease in yield in the aromatic product. Hitherto, therefore, conventional high severity reforming processes have been unable to realize the $C_6$ to $C_8$ aromatic hydrocarbons in significant yields.

One approach to this problem has been to prefractionate the naphtha feed stock into very narrow boiling range heartcuts containing only those aromatic precursors which have a lower boiling pont than the aromatics to be produced therefrom in order to allow the facile separation of the reformate into unconverted nonaromatic material and a mixture of $C_6$ to $C_8$ aromatic hydrocarbons. By employing such prefractionations, the amount of difficulty crackable paraffinic material is reduced, and consequently the reforming process may be operated under less severe reforming conditions, thereby reducing the volume loss resulting from high-severity reforming. For example, in U.S. Pat. No. 3,635,815, a naphtha feed fraction is prefractionated into an overhead fraction having an upper endpoint of 270° to 275° F. and a bottoms fraction having a higher endpoint. The overhead fraction is then catalytically reformed under reforming conditions of severity sufficient to convert any remaining paraffins to easily removable compounds. The resulting reformate is then subjected to a plurality of fractionation steps to produce a mixture of high-purity $C_8$ aromatic hydrocarbons.

While processes employing prefractionation steps produce reformates which yield aromatic hydrocarbons of adequate purity, upon fractionation these processes still achieve less than desirable yields. Prefractionation of the naphtha feed stocks into such very narrow boiling range fractions removes significant quantities of aromatic hydrocarbon precursors from the conversion process and correspondingly reduces the yield of $C_6$ to $C_8$ aromatic hydrocarbons per volume of naphtha feed.

It is also known in the art that the amount of naphthene destruction may be reduced somewhat by employing a two-step reforming process in which a naphtha feed is reformed under mild conditions in a first step and then thermally cracked in a second step. Even with the use of a two-step reforming process, conventional reforming processes produce a reformate having an aromatic hydrocarbon concentration and yield which is less than desirable. Since even under mild conditions conventionally employed reforming catalysts promote a significant amount of naphthene cracking, the yield of aromatic hydrocarbons per volume of naphthene feed is still less than desirable. Moreover, even under high-severity reforming conditions, conventionally employed reforming catalysts do not promote the cracking of nonaromatic, and particularly paraffinic, material with substantial completion. Accordingly, an aromatic product of less than desirable yield and purity is obtained from conventional processes, even with the utilization of a two-step reforming system. For example, in U.S. Pat. No. 3,499,945, the combination of a prefractionation step and a two-step reforming process is necessary to achieve a reformate of sufficient quality to produce a toluene product of commercially acceptable purity.

Cox. U.S. Pat. No. 2,642,384 teaches that the hydrocracking activity of a conventional platinum-halogen-alumina reforming catalyst may be increased by increasing the halogen content thereof. In patentee's invention, this discovery is employed to maintain the hydrocracking activity of the reforming catalyst constant throughout a reforming system by adding a small amount of a halogen compound to a reforming zone and reacting it with the reforming catalyst contained therein. Cox further teaches that this discovery may be employed to alter the quality of the reformate being produced. However, in Cox, catalyst modification is employed only to uniformly modify the entire catalyst inventory of the reforming system. Moreover, Cox is directed to the upgrading of gasolines, and not to the production of reformates suitable for use in the preparation of high-purity aromatics. In the upgrading of gasolines, it is desirable to convert the heavy paraffinic material to high octane branched paraffins. The formation of reformates containing a high percentage of desirable isoparaffins is incompatible with the production of reformates suitable for the preparation of high-purity compounds since the branched paraffins have a similar boiling range with the $C_6$ to $C_8$ aromatics, and consequently would preclude the production of the aromatic compounds in pure form without extensive subsequent purification.

SUMMARY OF THE INVENTION

Accordingly, it is an object of the instant invention to provide a high severity reforming process for the production of reformates of high aromatic concentration having a minimum amount of nonaromatic material with a heretofore unobtainable yield.

Still another object of the instant invention is the provision of a high-severity reforming process for the production of highly aromatic reformates, using a halogen promoted reforming catalyst, which maximizes the yield of aromatic hydrocarbons obtainable from each volume of naphtha feed, and which reduces the paraffinic content thereof to a minimum.

It is a particular object of the instant invention to provide a high-severity reforming process for the production of highly aromatic reformates suitable for use in the manufacture of high-purity $C_6$ to $C_8$ aromatic hydrocarbons of commercially acceptable quality.

An additional object of the instant invention is the provision of a high-severity reforming process for the production of reformates of high aromatic concentration suitable for use in the blending of high aromatic content motor gasolines.

Yet another object of the instant invention is to provide a process for the production of high-purity aromatic hydrocarbons, particularly $C_7$ and $C_8$ aromatic hydrocarbons, which eliminates the necessity for costly purification procedures such as solvent extraction or extractive distillation.

A specific object of the present invention is to provide a process for the production of high-purity mixed xylenes, and/or toluene, wherein a product of commercially acceptable purity can be produced without costly purification procedures, and wherein the yield of the aromatic hydrocarbons per volume of naphtha charge is maximized, by high severity reforming.

In accomplishing the foregoing and other objects, there has been provided in accordance with the present invention a high yield process for the production of a reformate product of high aromatic concentration from a naphtha feed fraction by high-severity catalytic reforming, using a halogen promoted reforming catalyst, which accrues a maximum concentration of aromatic hydrocarbons and a minimum amount of difficulty separable nonaromatic material. This process comprises reforming the naphtha feed under reforming conditions of high-severity in a plurality of sequentially arranged reaction zones in which the concentration of the halogen component or components of the reforming catalyst is adjusted to provide an enhanced hydrocracking activity to the catalyst in the last reaction zone or zones, and a minimal hydrocracking activity to the catalyst in the first reaction zone or zones.

The essence of the instant invention resides in reforming a naphtha feed stock under conditions in which the various reforming reaction zones are regulated by catalyst modification to produce a reformate having a maximum aromatic hydrocarbon content and a minimum content of difficulty separable nonaromatic material. Applicant has found that by reforming the naphtha feed in a multiple reaction stage reforming system in which the reforming conditions in the first reaction stage or stages are adjusted by catalyst modification to favor maximum conversion of the paraffinic and naphthenic material to aromatic compounds, and in the last reaction stage or stages, to increase the relative hydrocracking reaction rate of nonaromatic material relative to the other reforming reaction rates, paraffins and naphthenes may be preferentially converted to aromatic hydrocarbons without significant effect on the reformate yield. By employing the instant process, the conversion reaction of the naphthenes and paraffins to their corresponding aromatic hydrocarbons is allowed to go to substantial completion before the hydrocracking reaction is increased, thereby producing a maximum yield of aromatic hydrocarbons and a minimal loss to gaseous hydrocarbons. This result is unobtainable with conventional reforming processes, wherein the catalyst modification is not employed, from reaction stage to reaction stage, since even under mild reforming conditions, the reforming catalyst conventionally used therein produces a significant amount of naphthene cracking. Accordingly, by adjusting the halogen content of the reforming catalyst in the first reaction stages to favor the conversion reaction and to disfavor the cracking reaction, a heretofore unobtainable yield of aromatic hydrocarbons can be achieved. In the last reaction stages, then, the severity of the reforming conditions and the halogen content of the reforming catalyst is adjusted to increase the paraffin and naphthene cracking rate sufficiently to produce a minimum concentration of nonaromatic material in the reformate.

Production of reformates having a maximum aromatic hydrocarbon content is thus realized by utilizing catalyst modification to tailor the various reforming reactions to preferentially convert paraffins and naphthenes to aromatics. In order to maintain fine control over the balance between the various reforming reactions, it is an essential feature of the instant invention that the reforming operation occur under substantially dry conditions. By "substantially dry" conditions as herein used is meant that the reforming system contains a minimum amount of water. Since water tends to deplete the halogen concentration of the reforming catalyst, effective modulation of the reforming reactions requires a low water concentration. Applicant has found that for successful operation of the instant invention, the water concentration must be in the parts-per-million range, and preferably less than about 5-10 ppm water.

Broadly, the reformates produced according to the reforming process of the instant invention are ideally suited for use in the preparation of $C_6$ to $C_8$ aromatics, and particularly $C_7$ and $C_8$ aromatic hydrocarbons, with a yield and purity heretofore unobtainable. The high aromatic content and minimum concentration of difficulty separable nonaromatic material of these reformates enables high purity aromatic hydrocarbons, and particularly $C_7$ and $C_8$ aromatics, to be produced therefrom directly by fractional distillation, without the necessity of further expensive purification steps. Accordingly, in a further aspect, the present invention thus provides a highly efficacious method for the preparation of high-purity, commercial quality aromatic hydrocarbons.

Due to the current need for high-octane, lead-free motor gasolines, it is becoming more and more necessary to produce a high aromatic content reformate blending stock. The reforming process of the present invention is also ideally suited for this purpose, since the reformates produced thereby have a maximum aromatic concentration. The present invention thus further provides a highly efficacious method for the preparation of high aromatic content gasoline blending stocks.

Through the use of the process according to the present invention, aromatic hydrocarbons, and particularly $C_7$ and $C_8$ aromatics, may be produced in a highly pure form without the necessity for solvent extraction or other expensive purification procedures. Moreover, by employing catalyst modification, naphtha stocks may be reformed under reforming conditions of heretofore unobtainable severity without destruction of the aromatic hydrocarbon precursors, and consequently with a yield of $C_6$ to $C_8$ aromatic hydrocarbons from each volume of charge significantly increased in comparison to conventionally employed processes. Accordingly, the instant invention provides a particularly efficacious process for the production of highly aromatic reformates, wherein both aromatic content and yield is optimized.

Yet other objects and advantages of the instant invention will become apparent to the skilled artisan upon examination of the following detailed description of the present invention, taken in conjunction with the figure of drawing.

BRIEF DESCRIPTION OF THE DRAWING

The attached FIGURE of drawing is a schematic drawing of one embodiment of a reforming system operated in accordance with the instant invention.

DETAILED DESCRIPTION OF THE PREFERRED EMBODIMENTS

Applicant has found that highly aromatic reformates may be produced with yields superior to conventional processes, with a quality sufficient to enable the production of high-purity aromatic hydrocarbons, without the necessity for costly solvent extraction, extractive distillation, or the use of very narrow boiling range heartcuts by adjusting the halogen concentration of the halogen promoted reforming catalyst to achieve the selective cracking of the higher boiling nonaromatic material at a specified point in the reforming process. The basis of applicant's invention resides in his discovery that by controlling the balance between the various reforming reactions in a specified sequence through adjustment of the halogen concentration of the reforming catalyst, cracking of the $C_6$ to $C_8$ aromatic hydrocarbon precursors can be minimized and cracking of the unreacted nonaromatic hydrocarbons can be maximized. Accordingly, in the present invention, a naphtha feed fraction is reformed in a multiple reaction zone reforming system in which the halogen concentration of the halogen promoted reforming catalyst is adjusted to allow, in the first reaction zones, the dehydrogenation, isomerization, and dehydrocyclization reactions to go to substantial completion with a minimum of hydrocracking activity, and in the last reaction zones to enhance the reaction rate of unconverted paraffin and naphthene cracking relative to other reforming reaction rates. Since in the process of the instant invention the halogen concentration in the first reaction zones is adjusted to minimize hydrocracking, substantially all the aromatic precursors are converted to their corresponding aromatic with negligible amounts of precursor cracking, minimizing undesirable gas production. This result is unobtainable with prior art processes, wherein catalyst modification from reaction stage to reaction stage is not employed, since even under mild reforming conditions the concentrations of the halogen conventionally employed in reforming catalysts causes a significant amount of precursor cracking. Moreover, since the $C_6$ to $C_8$ aromatics are highly refractory and are much less affected by increasing concentrations of halogen and elevated temperatures, in the last reaction zones, the halogen concentration of the catalyst and temperature can be increased to produce a severity sufficient to yield a reformate having a minimum amount of nonaromatic material, without effect on the aromatic content. Accordingly, the process of the instant invention enables the use of ultimately high severities to achieve a selective cracking of unreacted nonaromatic material without significant adverse effect on the aromatic yield.

Referring now to the drawing, illustrated is a conventional reforming system, utilizing the process of the instant invention for the production of $C_6$ to $C_8$ aromatic hydrocarbons and particularly high purity $C_7$ and $C_8$ aromatic hydrocarbons. The reforming system may be of any type well known to those skilled in the art. For example, the reforming system may be a cyclic system, a semi-cyclic system, or a moving bed system. The only requirement for successful operation of the instant invention is that the particular system chosen be capable of high severity operation and comprise a plurality of sequentially arranged reaction zones. Moreover, the reaction zone may be housed in individual reactor vessels, or may be housed in a single vessel, as would be obvious to those skilled in the art. The reforming system may also be either an isothermal or adiabatic system. Suitably, the reforming system comprises at least three adiabatic reaction zones and preferably four. In the drawing the reforming system is illustrated as comprising four reforming reactors, 11, 17, 23, and 29. The particular reforming reactor utilized may be of any suitable construction and may be such as found in any typical refinery.

Disposed within the reforming reactors, 11, 17, 23, and 29 is the halogen promoted reforming catalyst. This type of catalyst is well known to those skilled in the art and any such suitable catalyst may be utilized in the instant invention. Typically, but not essentially, the halogen promoted reforming catalyst comprises a platinum group metal, combined halogen, and an inorganic refractory support, such as alumina. Optionally, the catalyst may further include an additional promoter, such as but not limited to rhenium, or iridium. In the preferred embodiment, the reforming catalyst comprises a platinum-halogen-rhenium based reforming catalyst. Suitable such a catalyst will comprise from 0.05 to 0.8 weight % platinum, from 0.1 to 10% by weight halogen, and from 0.02 to 0.8 weight percent rhenium, on an inorganic refractory support such as alumina. The halogen component may comprise chlorine, bromine, fluorine, iodine, and/or compounds thereof, and/or mixtures thereof, with chlorine being preferred and the most commonly used. The preparation of this type of catalyst is well known to those skilled in the art, and any suitable method may be employed. U.S. Pat. No. 2,848,377 and 4,000,058, herein incorporated by reference, describe two particularly efficacious methods for the preparation of these catalysts.

As has been emphasized, in the instant invention, the halogen concentration is adjusted to provide a minimal balance of hydrocracking activity, relative to the other reforming reactions, to the reforming catalyst in the first reaction zone or zones, and to provide an enhanced cracking activity to the reforming catalyst in the last reforming zone or zones. In one embodiment, this may be achieved by progressively increasing the halogen concentration from the first reforming reactor 11 to the last reforming reactor 29. Alternatively, in a second embodiment, the halogen concentration is adjusted to provide a minimal hydrocracking activity in the reactors 11, 17 and 23, and is increased only in the last reactor 29. When the halogen concentraton is progressively increased from reactor 11 through reactor 29, the halogen concentration will typically progressively increase from 0.1 to 1.0 weight percent in reactor 11 to a range of from about 0.5 to about 2.0 weight percent in reactor 29. Alternatively, when the halogen concentration is increased only in reactor 29, the halogen concentration in reactors 11, 17, and 23 typically comprises 0.5 to 1.0 weight percent halogen, and in reactor 29 0.5 to 2.0 weight percent halogen.

The halogen concentration of the reforming catalyst may be adjusted by any means well known to those skilled in the art. Typically, however, the halogen concentration is increased by contacting the reforming catalyst with a halogen or a compound thereof which is capable of reacting with the alumina in the catalyst at the reforming condition or to undergo conversion in the reaction zone to a form that is reactible with the alumina at the reforming condition. Suitable halogen compounds include but are not limited to chlorine, fluorine, hydrogen chloride, ammonium chloride, monochloro acetic acid, trichloro acetic acid, carbon tetrachloride, chloroform, tertiary butylchloride, hydrogen fluoride, cyclohexylfluoride, isopropyl fluoride, tertiary butyl-fluoride, hydrogen bromide, bromine, and di-chloro, di-fluoromethane. It should be further noted, that the halogen in the halogen compound that is added to the reforming catalyst may be the same as the halogen in the catalyst. However, the halogen compound may also contain a different halogen. In operation, an increase in the halogen concentration of the reforming catalyst may be achieved by adding the halogen compound directly to the reacton zone for contact with the reforming catalyst.

The reforming reactors 11, 17, 23, and 29 may be cyclically operated, semi-cyclically operated, or even of the moving bed type. When the reforming system is of the semi-cyclic or cyclic type, the halogen concentration of the reforming catalyst in each reaction zone will typically be adjusted during the regeneration procedure to its desired level. As discussed above, during the regeneration cycle, the halogen concentration will be adjusted in each reactor in such a manner so as to provide a minimal hydrocracking activity to the reforming catalyst in the first reactors, and a higher hydrocracking activity to the reforming catalyst in the last reactors. In a moving bed type of operation, though, where the reforming catalyst is circulated from the first through the last reactor vessels, in the regeneration vessel the halogen concentration is adjusted to the level desired for the first reaction zone. As the catalyst is then moved from the first stage or stages the halogen content is increased by contacting the catalyst with a halogen or halogen compound. Alternatively, the halogen concentration may be adjusted by contacting the catalyst with the halogen compound as the catalyst flows from one reaction zone to another.

As illustrated in the drawing, the naphtha charge stock desired to be reformed is introduced through line 1 and is admixed with a recycled stream of hydrogen gas conducted through line 3. The naphtha stock may be any suitable naphtha feed. Moreover, it is within the scope of the instant invention to pretreat the naphtha feed to remove impurities such as sulfur compounds, nitrogen compounds, oxygen compounds and heavy metals. Conventionally, the naphtha feed comprises a $C_6$-400° F. naphtha fraction.

Generally, the naphtha feed may comprise a naphtha fraction, relatively free of normally gaseous hydrocarbons, boiling between about 90° F. and about 450° F., with a $C_6$-400° F. naphtha fraction being preferred. However, when it is desired to produce a reformate suitable for the production of high quality aromatic hydrocarbons, a particularly suitable naphtha feed comprises a $C_7$ and/or $C_8$ full boiling carbon number naphtha. As fully described in the aforementioned application, the term "full boiling carbon number naphtha fraction" refers to a naphtha fraction which has an ASTM distillation boiling range sufficient to include substantially all of the paraffins, naphthenes, and aromatic compounds having the same number of carbon atoms per molecule as the aromatics desired to be produced. Applicant has found that a naphtha feed with this boiling range contains essentially all of the naphthenes and paraffins of the proper number of carbon atoms per molecule which are convertible to $C_6$ to $C_8$ aromatic hydrocarbons, and minimizes the concentrations of paraffins and heavy naphthenes which can contaminate the $C_6$ to $C_8$ aromatic product. As especially useful full boiling carbon number naphtha fraction comprises a $C_6$ to $C_8$ naphtha fraction having an ASTM distillation endpoint of about 300° F. to about 360° F., and preferably of about 325° F., since the utilization of such a fraction as a reformer charge enables the production of $C_7$ and $C_8$ aromatics with a particularly high purity, and a $C_6$ aromatic hydrocarbon concentrate.

Since water tends to deplete the halogen concentration of the reforming catalyst, in the instant invention, in order to maintain fine control over the balance between the various reforming reactions, it is essential that the amount of water entering into the reforming system be maintained at a very low level. Accordingly, it is also within the scope of the instant invention that the naphtha feed be subjected to a water-removal pretreatment step. This step may be conducted simultaneously with the stabilization associated with the hydrodesulfurization of the naphtha feed. Applicant has found that for successful operation of the instant invention, the reforming system must be maintained in a substantially dry condition. Effective modulation of the balance between the various reforming reactions requires that a water concentration be in the parts-per-million range, and preferably less than about 5–10 ppm water.

After admixture with the hydrogen recycle stream, the combined naphtha feed and hydrogen stream is conducted through exchanger 33 and then through line 5 to heater 9 and the reformer reactor 11 wherein it is reformed under conditions maximizing conversion of the nonaromatic material to the corresponding aromatics, relative to hydrocracking. The partially converted feed stream is then withdrawn through line 13, passed through heater 15 and introduced to the reactor 17 where it is subjected to further reforming under conditions which further favor the conversion of nonaromatics to the corresponding aromatic hydrocarbons and which minimize hydrocracking. When it is desired to employ a reforming system wherein the halogen concentration is progressively increased from the reactor 11 to the reactor 29, the halogen concentration of the reforming catalyst in the reactor 17 will be increased as discussed above. The further converted mixture of reactants and recycle hydrogen is then removed through line 19, passed through heater 21, and introduced into the last minimum cracking activity reactor 23 wherein the conversion of nonaromatic to aromatic achieves substantial completion, thereby enabling maximum production of aromatic hydrocarbons. The stream of reactants and recycle hydrogen issuing from reactor 23 consists essentially of aromatic hydrocarbons with a minor portion of residual naphthenes and paraffins. This stream is then transported via line 25 through heater 27 and introduced into the high severity reactor 29 wherein the halogen concentration of the reforming catalyst and temperature is adjusted to provide an enhanced hydrocracking activity. In a moving bed type of operation, the halogen concentration of the reforming catalyst will be adjusted by contacting the reforming catalyst with a halogen or halogen compound after its exit from the reactor 23 and before its entrance into the reactor 29. As will be understood by those skilled in the art, however, several other possible means of adjusting the halogen content of the reforming catalyst are also possible. Since the aromatics are highly stable compounds and are virtually unaffected by increasing concentrations of halogens and elevated temperatures, the remaining uncoverted nonaromatics are preferentially cracked to lower boiling easily removable hydrocarbons, yielding a reformate and recycle hydrogen through line 31 containing a maximum aromatic content and a minimum of difficulty separable nonaromatic material.

By employing a multiple reaction zone reforming system wherein the reforming catalyst is modified to diminish hydrocracking activity in one phase of the reforming process and to enhance hydrocracking activity in another phase of the reforming process, the reforming conditions can be tailored to maximize the formation of $C_6$ to $C_8$ aromatic hydrocarbons. Moreover, the use of at least three and preferably four reaction stages enables the reforming conditions to be adjusted incrementally so as to provide reforming conditions optimum for each stage of the reforming reaction, thereby further maximizing the amount of $C_6$ to $C_8$ aromatic obtainable from each volume of charge. Accordingly, since most of the aromatic hydrocarbon precursors are converted to the aromatic before the hydrocracking reaction is enhanced, the reforming process may be operated in the last reaction stages at heretofore unutilizable severities without unnecessary destruction of $C_6$ to $C_8$ aromatic hydrocarbon precursors. By operating at heretofore unutilizable severities, conversion of the unreacted nonaromatic hydrocarbons to components which are readily removed by distillation can be achieved to a far higher degree than heretofore possible. Consequently, a broad boiling range reformer charge, containing essentially all of the $C_6$ to $C_8$ aromatic precursors, may be utilized without an adverse effect on the purity of the resultant product, and without the necessity of a solvent extraction step, extractive distillation step, or a prefractionation step, to produce high-purity commercial quality aromatic hydrocarbons.

Generally, as has been emphasized, the reforming conditions are adjusted to provide maximum naphthene conversion in the first reaction zone and a maximum hydrocracking activity in the last reaction zone, and will preferably be of sufficient severity to produce a reformate having a research clear octane value of at least about 100. The severity of the reforming conditions may be measured by the temperature at which the reforming zone is maintained at a given space velocity. Typically, the reforming conditions include a temperature in the range of 800° F. to 1100° F. or more, and preferably in the range of about 850° F. to 1000° F., and a pressure in the range of 50 psig to about 1000 psig or more, and preferably from 100 psig to 300 psig. The reforming process is also preferably maintained at a liquid hourly space velocity (1 hsv) of 0.1 to 20 or more, and preferably in the range of from about 0.5 to 15.0 or more, and a recycle hydrogen rate of from about 1.0 to 20 or more moles of hydrogen per mole of hydrocarbon feed. Applicant has found that optimum results are obtained in the instant invention when a temperature in the range of 950° F. to 970° F. is maintained in the last reaction stage or stages, and a temperature of from 850° F. to 900° F. is maintained in the first reaction stages.

Alternatively, the severity of the reforming conditions may be measured by the $C_5+$ reformate octane number, as described in U.S. Pat. No. 3,635,815, herein incorporated by reference, as will be obvious to those skilled in the art. In still another manner, the severity of the reforming conditions may be measured by the nonaromatic concentration within a defined boiling range fraction of the reformate product such as the toluene fraction. This is the preferred measure of severity due to the difficulty in measuring octane with reproducible results about 100 research clear octane.

After reforming, the resultant reformate is withdrawn through line 31 to exchanger 39, then through line 36 to cooler 38, and finally through line 40 to product separator 35. In the separator 35, the reformate product is separated into a liquid hydrocarbon reformate and a stream of recycle hydrogen gas. The recycle hydrogen is then withdrawn through line 41, and compressed in compressor 39 for return to the reforming system via line 3. Net hydrogen is withdrawn through line 42 for use in other refractory operations. The unstabilized reformate is withdrawn from separator 35 through line 37, and is transported to a system of fractionation columns wherein the $C_7$ and $C_8$ aromatic hydrocarbons are obtained in highly pure form without the necessity of a solvent extraction step or other costly separation techniques, and a $C_6$ aromatic concentrate. Typically, the fractionation system will comprise a first fractionation column to separate the reformate into a low boiling overhead fraction and a $C_6+$ bottoms fraction, a second fractionation column for separating a $C_6$ to $C_8$ aromatic hydrocarbon overhead fraction from any residual $C_9+$ hydrocarbons by fractional distillation, and subsequent fractional distillation columns for separating the $C_6$ to $C_8$ aromatic hydrocarbon fraction into high-purity $C_7$ and $C_8$ aromatics and a $C_6$ aromatic concentrate. The particular fractionation system employed, however, may comprise any system capable of separating the reformate into the individual $C_6$ to $C_8$ aromatic compound with a high efficacy.

Use of the instant invention thus provides a facile and economical method for production of reformates of maximum aromatic hydrocarbon content with a heretofore unobtainable yield. Through the use of catalyst modification, the reforming reaction rates are regulated to provide maximum aromatic hydrocarbon production with a minimum concentration of difficulty removable nonaromatic material. In contrast to conventional processes, the reformates produced by the process of the instant invention yield high-purity commercial quality $C_7$ and/or $C_8$ aromatic hydrocarbons directly upon separation by fractional distillation. Accordingly, the instant invention further provides a highly advantageous process for the production of highpurity $C_7$ and/or $C_8$ aromatic hydrocarbons.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the production of highly aromatic reformates, suitable for use as blending stocks in the blending of high aromatic content gasoline or the preparation of high purity aromatics, from a naphtha feed fraction by high severity catalytic reforming, using a halogen promoted reforming catalyst, comprising reforming said naphtha feed under reforming conditions of high severity and substantial dryness in a plurality of sequentially arranged reaction zones in which the concentration of the halogen component of the reforming catalyst is adjusted to provide an enhanced hydrocracking activity to the catalyst in the last reaction zones, and a minimal hydrocracking activity to the catalyst in the first reaction zones.

2. The process of claim 1, wherein said reforming conditions include a moisture level of less than about 5-10 ppm water.

3. The process of claim 1, wherein the concentration of the halogen component of said reforming catalyst is adjusted by adding a halogen or halogen-containing compound to said last reaction zones.

4. The process of claim 3, wherein the halogen or halogen-containing compound contains a different halogen than that of the halogen component of said reforming catalyst.

5. The process of claim 3, wherein the halogen-containing compound contains the same halogen as that of the halogen component of the reforming catalyst.

6. The process of claim 1, wherein said naphtha feed fraction is reformed in at least three reaction zones.

7. The process of claim 1, wherein said naphtha feed fraction is reformed in at least four reaction zones.

8. The process of claim 1, wherein the halogen concentration of said catalyst is progressively increased from the first to the last of said reaction zones.

9. The process of claim 8, wherein the halogen concentration of said catalyst is progressively increased from about 0.5 to about 2.0 weight percent.

10. The process of claim 1, wherein the halogen concentration of said catalyst is maintained at a greater concentration in the last reaction zone than in the preceding reaction zones.

11. The process of claim 10, wherein the halogen concentration of said catalyst comprises about 1.0 or more weight percent in the last reaction zones and about 0.5 weight percent in the remaining reaction zones.

12. The process of claim 1, wherein said reforming conditions comprise a temperature of from about 800° F. to about 1100° F., a pressure of from about 50 psig to about 1000 psig, a liquid hourly space velocity of from about 0.1 to about 20.0, and a recycle hydrogen rate of from about 1.0 to 20.0 or more moles of hydrogen per mole of hydrocarbon feed.

13. The process of claim 12, wherein said temperature is maintained in the range of from about 950° F. to about 975° F. in the last reaction zones and from about 850° F. to about 900° F. in the first reaction zones.

14. The process of claim 1, wherein said halogen component of said reforming catalyst comprises chlorine or compounds thereof.

15. The process of claim 1, wherein said reforming conditions are of sufficient severity to produce reformates having an ASTM research clear octane value of about 100 or more.

16. The process of claim 1, wherein said reforming conditions are of sufficient severity to produce $C_5$ and higher boiling reformates of sufficient quality to directly yield high purity aromatic hydrocarbons selected from the group of $C_7$, $C_8$, or $C_7$ and $C_8$ aromatic hydrocarbons upon fractional distillation.

17. A process for the production of high purity aromatic hydrocarbons selected from the group consisting of $C_7$, $C_8$, or $C_7$ and $C_8$ aromatic hydrocarbons in high yield from a naphtha feed fraction by high-severity catalytic reforming, using a halogen-promoted reforming catalyst, and fractional distillation, comprising the steps of:

(a) reforming said naphtha feed under reforming conditions of high-severity and substantial dryness in a plurality of sequentially arranged reaction zones in which the concentration of the halogen component of the reforming catalyst is adjusted to provide an enhanced hydrocracking activity to the catalyst in the last reaction zones, and a minimal hydrocracking activity to the catalyst in the first reaction zones; and (b) fractionally distilling the resultant reformate to directly recover said aromatic hydrocarbons in highly pure form.

18. The process of claim 17, wherein said naphtha feed fraction is a $C_6$ to $C_8$ naphtha fraction having an ASTM distillation endpoint of about 300° F. to about 360° F.

19. The process of claim 17, wherein said naphtha free fraction is a $C_6$ to $C_8$ naphtha fraction having an ASTM distillation endpoint of about 400° F.

20. The process of claim 17, wherein said naphtha feed fraction is reformed in at least three reaction zones.

21. The process of claim 17, wherein the halogen concentration of said catalyst is progressively increased from the first to the last of said reaction zones.

22. The process of claim 21, wherein the halogen concentration of said catalyst is progressively increased from about 0.5 to about 2.0 weight percent.

23. The process of claim 17, wherein the halogen concentration of said catalyst is maintained at a greater concentration in the last reaction zone than in the preceding reaction zones.

24. The process of claim 23, wherein the halogen concentration of said catalyst comprises about 1.0 to more weight percent in the last reaction zone and about 0.5 weight percent in the remaining reaction zones.

25. The process of claim 17, wherein said reforming conditions include a moisture level of less than about 5–10 ppm water.

26. The process of claim 17, wherein said reforming conditions are sufficient to produce a $C_5$ and higher boiling reformate having a minimum concentration of non-aromatic material, and an ASTM research clear octane value of about 100 or more.

27. A process for the production of highly aromatic reformates, suitable for use as blending stocks in the blending of high aromatic content gasoline or the preparation of high purity aromatics, from a naphtha feed fraction by high severity catalytic reforming, using a halogen promoted reforming catalyst, comprising reforming said naphtha feed under reforming conditions of high severity and substantial dryness in a plurality of sequentially arranged reaction zones in which the concentration of the halogen component of the reforming catalyst is progressively increased from the first to the last of said reaction zones to provide an enhanced hydrocracking activity to the catalyst in the last reaction zones, and a minimal hydrocracking activity to the catalyst in the first reaction zones.

* * * * *